UNITED STATES PATENT OFFICE.

HENRY ALFRED GARDNER, OF WASHINGTON, DISTRICT OF COLUMBIA.

VULCANIZED-RUBBER COMPOSITION AND METHOD OF PREPARING SAME.

1,247,257.     Specification of Letters Patent.     Patented Nov. 20, 1917.

No Drawing.     Application filed July 31, 1917. Serial No. 183,772.

*To all whom it may concern:*

Be it known that I, HENRY A. GARDNER, a citizen of the United States, residing at Washington, in the District of Columbia, have invented certain new and useful Improvements in Vulcanized-Rubber Compositions and Methods of Preparing Same, of which the following is a specification.

In my prior Patent No. 1,216,980, patented February 20, 1917, I have disclosed and broadly claimed a composition of matter comprising an organic vehicle, including rubber, and a mineral pigment consisting of or containing a substantial proportion of an insoluble compound of zirconium. As pointed out in said patent, such zirconium compounds are useful as colorants for rubber and serve to increase its tensile strength.

My investigations have shown that insoluble compounds of zirconium in a state of fine subdivision, are remarkably efficient not only as rubber colorants, but for the purpose of preparing vulcanized rubber articles possessing a very high tensile strength and likewise a high degree of toughness, connoting excellent wearing qualities. It appears further that these zirconium compounds possess a distinct value as accelerants in the vulcanizing process itself.

The present application relates to the art of vulcanizing rubber, and the invention comprises vulcanized rubber articles having as one of their components an insoluble compound of zirconium. The invention comprises also the method of preparing such vulcanized rubber articles.

I have demonstrated that the extraordinary hiding power possessed by finely-divided zirconium compounds is strongly evidenced in rubber compositions; and by the use of such pigments, or pigment-mixtures, in proper proportions, I am able to prepare rubber articles possessing a characteristic degree of opacity, and an unusually light color in case white zirconium pigments are used. This opacity, as well as the masking of the original color of the rubber, is attributable, as disclosed in my prior patent above mentioned, to the high refractive index of zirconium compounds, this index in some cases, for example zirconium oxid, being as high as 2.20. Thus when rubber is compounded on the rolls in the usual manner with a sufficient proportion of a suitable finely-divided artificial or natural zirconium compound, such as those below mentioned, the dark color of the rubber is quickly obscured and an opaque rubber composition is formed. Moreover, since the zirconium compounds are not affected by the sulfur usually incorporated in such mixtures with a view to vulcanization, the light color and opaque character of the composition are found to be very persistent and are not materially modified by the vulcanizing process.

Among the insoluble zirconium compounds, I prefer to use the oxid, native or produced through precipitation methods; the silicate, including ground native silicates and silicious deposits; and such combined pigments as are described in my prior patent above mentioned, according to which zirconium oxid is precipitated upon or intimately commingled with base pigments of lower refractive index, such as zinc oxid, silica, barium sulfate and the like.

The following is an illustrative example of the application of my method to the preparation of a vulcanized rubber suitable for various purposes: 200 parts by weight of washed rubber are worked on the rolls until the mass becomes soft and receptive of mineral fillers. There are then added about 100 parts of any suitable zirconium-containing compound, for example zirconium oxid in a state of fine subdivision, also about 15 parts of sulfur, and preferably also the usual amount of inorganic or organic accelerators. Working is continued until a thoroughly homogeneous plastic mass is produced. Or I may incorporate with the rubber a preformed mixture of a zirconium-containing pigment with an organic vehicle, for example such mixtures as are referred to in my Patent No. 1,216,980. I may also add any suitable colorant for imparting a red, black, brown or other color to the composition. The mass may then be shaped and vulcanized in the usual manner. The above and other modifications of my invention may be made without departing from the spirit thereof.

In the use of these rubber compositions containing zirconium pigments, it has been observed that the time required for vulcanization is less than is necessary when like proportions of certain other mineral fillers are used, which fact indicates clearly that the zirconium-containing substances act as accelerators of vulcanization. Apparently also the presence of the zirconium compounds induces in the mass other physical or chemical changes of a little-understood nature, these changes taking place during the steps of incorporating the material, or of vulcanizing, or during both of these operations, with the resulting formation of a rubber composition having an extremely high tensile strength, and a high degree of toughness, this last-mentioned quality being of particular value under such exacting conditions as the use of the vulcanized composition for automobile tire treads and the like.

I claim:—

1. The method of preparing a vulcanized rubber composition, which consists in incorporating a finely-divided insoluble zirconium compound with rubber, and vulcanizing the composition.

2. A vulcanized rubber composition containing a finely-divided insoluble zirconium compound.

3. A vulcanized composition characterized by its high tensile strength and toughness, and by the presence therein of a finely-divided insoluble zirconium compound.

In testimony whereof, I affix my signature.

HENRY ALFRED GARDNER.

Copies of this patent may be obtained for five cents each, by addressing the "Commissioner of Patents, Washington, D. C."